United States Patent
Yi et al.

(10) Patent No.: US 6,771,603 B2
(45) Date of Patent: Aug. 3, 2004

(54) METHOD FOR CONTROLLING DATA FLOW IN COMMUNICATION SYSTEM

(75) Inventors: Seung June Yi, Seoul (KR); Jin Young Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 562 days.

(21) Appl. No.: 09/899,943

(22) Filed: Jul. 9, 2001

(65) Prior Publication Data

US 2002/0004389 A1 Jan. 10, 2002

(30) Foreign Application Priority Data

Aug. 7, 2000 (KR) ........................................ 2000-45681

(51) Int. Cl.⁷ ................................................. H04J 1/16
(52) U.S. Cl. ....................................................... 370/236
(58) Field of Search ................................. 370/236, 229, 370/230, 231, 232, 233, 235, 241, 252, 254, 349, 350, 345, 328, 338, 389, 392, 394, 401, 351, 352; 455/428, 403, 405, 450, 452.1, 452.2, 453, 455

(56) References Cited

U.S. PATENT DOCUMENTS 6,038,216 A  *  3/2000  Packer ........................ 370/231
6,298,041 B1 * 10/2001  Packer ........................ 370/231
6,415,410 B1 *  7/2002  Kanerva et al. ............ 714/749

* cited by examiner

Primary Examiner—Dang Ton
(74) Attorney, Agent, or Firm—Fleshner & Kim, LLP

(57) ABSTRACT

A method for controlling a data flow in a communication system including an originating system and a receiving system is disclosed. The method includes repeating to transmit the desired window size number greater than 0 from the receiving system to the originating after a predetermined time period had elapsed since the last transmission of the window size number, said repeating being continuously performed until any one of corresponding PDUs is transmitted to the receiving system. The method further includes a step of terminating a connection between two systems if there is no corresponding PDU transmitted to the receiving system until said repeating is performed a predetermined number of times.

8 Claims, 3 Drawing Sheets

METHOD FOR CONTROLLING DATA FLOW IN COMMUNICATION SYSTEM

BACKGROUND OF THE INVENTION

1. Field of the Invention

The present invention relates to a next generation mobile communication, and more particularly, to a method for controlling a data flow in a communication system.

2. Discussion of the Related Art

Generally, a sliding-window data flow control is widely used when transmitting packets in a communication system in order to prevent losses of the packets and for many other purposes. Particularly, the sliding-window data flow control in a radio link control (hereinafter, "RLC") layer has its window size being in the range of 0 to $2^{12}-1$, and each packet having its sequence number within the range of the window size is transmitted to a receiving system.

FIG. 1 illustrates a typical sliding-window data flow control procedure in a communication system according to the prior art. According to the FIG. 1, a receiving system in the RLC layer initially sends a window size number (hereinafter, "WSN"), which limits the number of protocol data units (hereinafter, "PDU") subjected to be transmitted, to an originating system (S9). Then the originating system generates a corresponding number of PDUs based on the window size number received and transmits them to the receiving system (S10, S11). However, when a severe congestion occurs due to overloads in the system resources and the limited capacity of the system environment, the receiving system sets the WSN equal to 0 and transmits it back to the originating system (S12) After the originating system suspects that the congestion has occurred in the receiving system by receiving the WSN set to 0, it resets Tx_window_size to 0 and stops transmitting the PDUs. When the originating system receives the WSN greater than 0 from the receiving system after the congestion is terminated (S13), it resets the Tx_window_size based on the WSN received and begins to transmit the corresponding PDUs again. However, if the WSN is lost or not reached to the originating system for some reason, the originating and receiving systems will be in at total deadlock situations. In other words, the receiving system keeps waiting to receive the PDUs corresponding to the lost WSN the receiving system has sent, and the originating system still does not transmit any PDUs since the value of the Tx_window_size is still equal to 0. Consequently, said deadlock situations result ineffective uses of the system resources and unnecessary delays.

SUMMARY OF THE INVENTION

Accordingly, the present invention is directed to a method for controlling a data flow that obviates one or more problems due to limitations and disadvantages of the related art.

An object of the present invention is to provide a method for controlling a data flow in a communication system that eliminates or breaks the deadlock situations in originating and receiving systems resulting from the loss of the WSN the receiving system has sent to the originating system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the objects and in accordance with the purposes of the invention, as embodied and broadly described herein, a method of controlling a data flow in a communication system includes transmitting a window size number equal to 0 from said receiving system to said originating system in order to stop transmitting protocol data units (PDU); transmitting a desired window size number greater than 0 from the receiving system to the originating system; retransmitting the window size number greater than 0 after a predetermined time period has elapsed since the last transmission of the desired window size number, said repeating being continuously performed until any one of corresponding PDUs is transmitted from the originating system to the receiving system; stopping said repeating and completing to transmit all of the corresponding PDUs if there is any one of the corresponding PDUs is transmitted from the originating system to the receiving system; and reporting an error to a higher layer and terminating a connection between the originating and receiving systems if there is no corresponding PDU transmitted to the receiving system until said retransmission is repeated a predetermined number of times.

It is to be understood that both the foregoing general description and the following detailed description of the present invention are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein.

DETAILED DESCRIPTION OF THE INVENTION

Reference will now be made in detail to the preferred embodiments of the present invention, examples of which are illustrated in the accompanying drawings.

Figure 1:
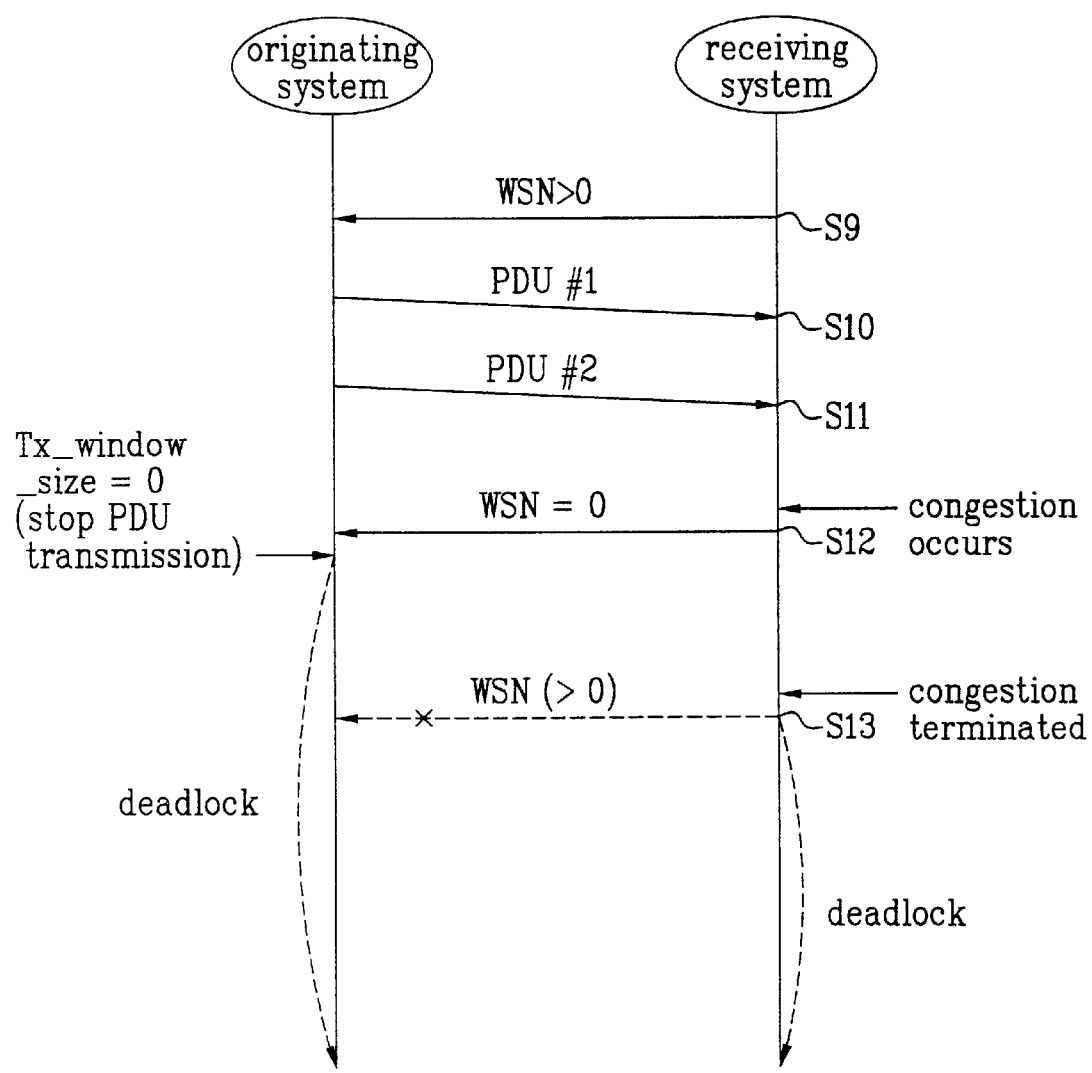
FIG. 1 illustrates a typical sliding-window data flow control procedure in a communication system according to the prior art.
Figure 2:
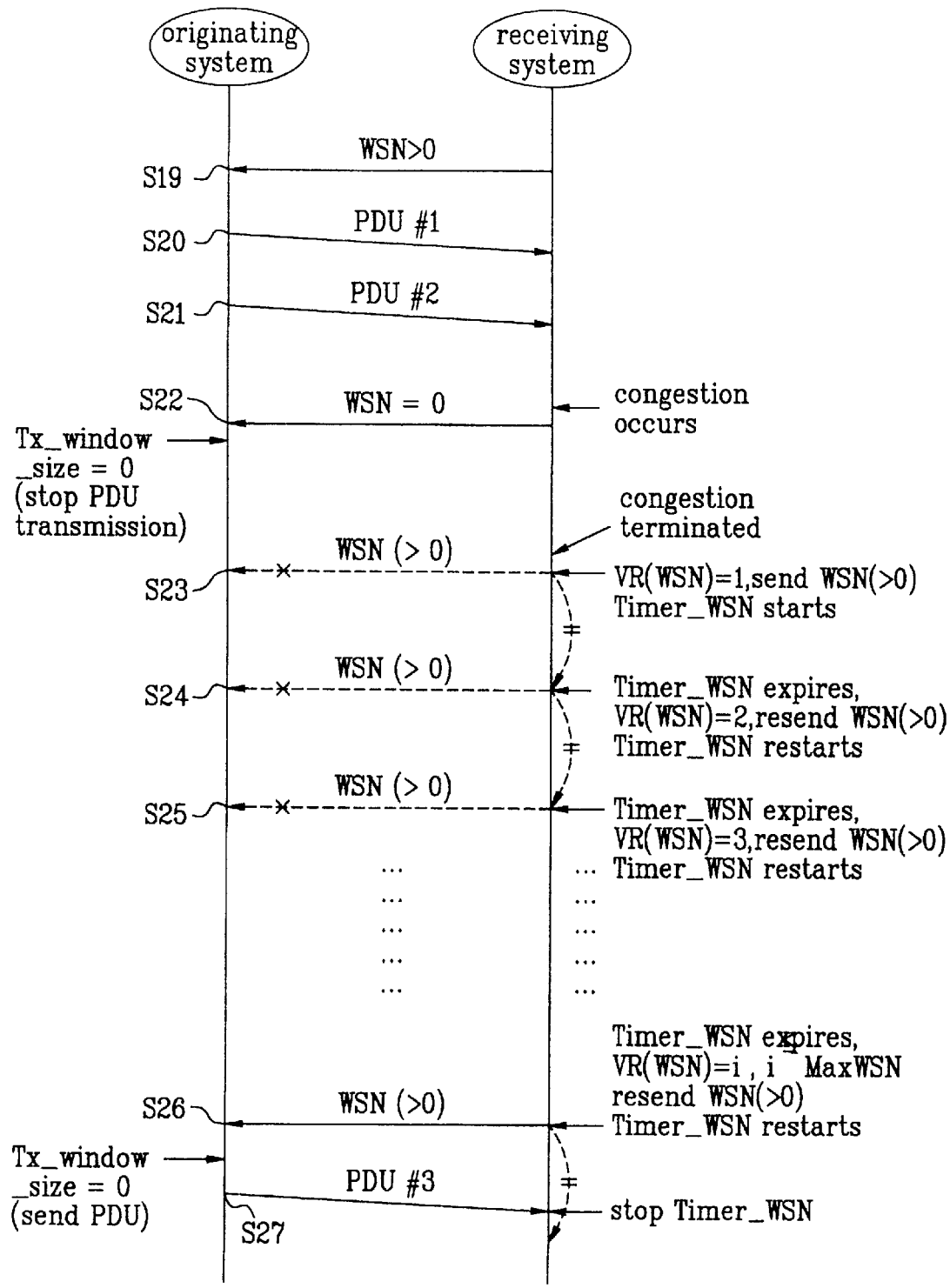
FIG. 2 illustrates a data flow control procedure in a communication system according to the present invention.

FIG. 2 illustrates a data flow control procedure in a communication system having a originating system and a receiving system according to the present invention. The originating or receiving system can be a mobile station or base station in a mobile communication system, and a wireless channel can be used in the communication system for data transmissions.

According to the FIG. 2, a receiving system in the RLC layer initially sends a window size number (hereinafter, "WSN") greater than 0, which limits the number of protocol data units (hereinafter, "PDU") subjected to be transmitted to a receiving system, to an originating system (S19). Then the originating system resets the value of Tx_window_size based on the WSN received and generates a corresponding number of PDUs based on the reset value of the Tx_window_size, and the system finally transmits those PDUs to the receiving system (S20, S21). When a severe congestion occurs due to overloads in the system resources and the limited capacity of the system environment, the receiving system sets the WSN to 0 and transmits it to the originating system (S22). After the originating system suspects that the congestion has occurred in the receiving system by receiving the WSN set to 0, it resets the value of Tx_window_size equal to 0 and stops transmitting the PDUs.

After the congestion is terminated, the receiving system sends the WSN greater than 0 to the originating system (S23), and concurrently, Timer_WSN (a time clock) begins to run. At this time, the value of VR, which represents the number of WSN retransmissions performed, is equal to 1. The value of VR increases by one after each retransmission of the WSN. Then the originating system generates and sends the corresponding PDUs after resetting the value of Tx_window_size based on the WSN received.

If the receiving system does not receive any corresponding PDU until the Timer_WSN expires, it resends the WSN and restarts Timer_WSN, and this process is repeated (S24, S25) until any corresponding PDU is transmitted to the receiving system. When the WSN (>0) is finally transmitted to the originating system during the retransmission process (S26), and any corresponding PDUs are transmitted to the receiving system, the receiving system stops the Timer$_{13}$ WSN and terminates the retransmission process while completing to transmit all of the corresponding PDUs.

Figure 3:
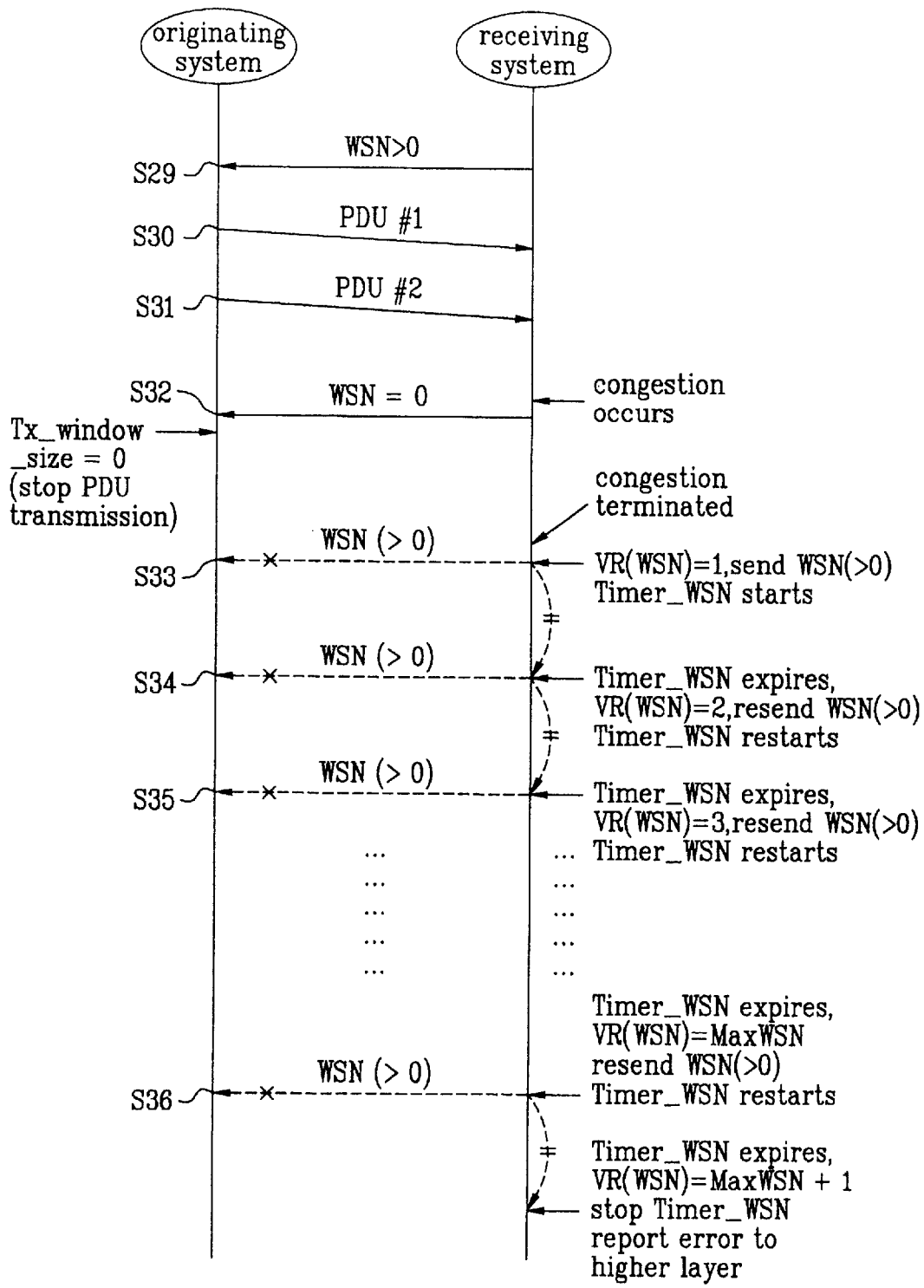
FIG. 3 illustrates a data flow control procedure in a communication system according to the present invention when an error is occurred.

If there is no PDU transmitted to the receiving system as shown in FIG. 3 until VR is equal to MaxWSN+1 where MaxWSN represents the predetermined maximum number of retransmission processes (S36), the receiving system terminates the retransmission process and reports the error to the higher layer when the corresponding Timer_WSN is expired. Finally, the connection between the originating and receiving systems is terminated.

As shown above, the data flow control in a communication system using the window timer according to the present invention prevents the deadlock situations in both receiving and originating systems. This benefit will consequently stabilize the whole communication system, and also data processing capacity (throughput) of the system will be greatly enhanced.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of controlling a data flow in a communication system having an originating system and a receiving system, comprising the steps of:

(a) transmitting a desired window size number greater than 0 from said receiving system to said originating system;

(b) repeating the step (a) after a predetermined time period has elapsed since the last transmission of said desired window size number greater than 0, said repeating being continuously performed until any one of corresponding protocol data units (PDUs) is transmitted from said originating system to said receiving system;

(c) terminating a connection between said originating and receiving systems if there is no corresponding protocol data unit (PDU) transmitted to said receiving system until the step (a) is repeated a predetermined number of times.

2. A method of claim 1, wherein said originating system is any one of a base station and a mobile station in a mobile communication system.

3. A method of claim 1, wherein said receiving system is any one of a mobile station and a base station in a mobile communication system.

4. A method of claim 1, wherein said communication system uses a wireless channel for data transmissions.

5. A method of controlling a data flow in a communication system having an originating system and a receiving system, comprising the steps of:

(a) transmitting a window size number equal to 0 from said receiving system to said originating system in order to stop transmitting protocol data units (PDU) to said receiving system;

(b) transmitting a desired window size number greater than 0 from said receiving system to said originating system;

(c) repeating the step (b) after a predetermined time period has elapsed since the last transmission of said desired window size number greater than 0, said repeating being continuously performed until any one of corresponding PDUs is transmitted from said originating system to said receiving system;

(d) stopping said repeating and completing to transmit all of said corresponding PDUs if there is any one of said corresponding PDUs is transmitted from said originating system to said receiving system; and (e) reporting an error to a higher layer and terminating a connection between said originating and receiving systems if there is no corresponding PDU transmitted to said receiving system until the step (b) is repeated a predetermined number of times.

6. The method of claim 5, wherein said originating system is any one of a base station and a mobile station in a mobile communication system.

7. The method of claim 5, wherein said receiving system is any one of a mobile station and a base station in a mobile communication system.

8. The method of claim 5, wherein said communication system uses a wireless channel for data transmissions.

* * * * *